US005423125A

United States Patent [19]

Wetzel

[11] Patent Number: 5,423,125

[45] Date of Patent: Jun. 13, 1995

[54] ELECTRIC SHAVING APPARATUS

[75] Inventor: Matthias Wetzel, Frankfurt, Germany

[73] Assignee: Braun Aktiengesellschaft, Frankfurt, Germany

[21] Appl. No.: 150,181

[22] PCT Filed: May 19, 1992

[86] PCT No.: PCT/EP92/01098

§ 371 Date: Nov. 30, 1993

§ 102(e) Date: Nov. 30, 1993

[87] PCT Pub. No.: WO92/21485

PCT Pub. Date: Dec. 10, 1992

[30] Foreign Application Priority Data

Jun. 3, 1991 [DE] Germany ........................ 41 17 988.9

[51] Int. Cl.⁶ ........................ B62B 19/10; B62B 19/38

[52] U.S. Cl. ........................ 30/34.1; 30/43.92

[58] Field of Search .................... 30/34.1, 34.05, 43.1, 30/43.92

[56] References Cited

U.S. PATENT DOCUMENTS 3,780,434 12/1973 deBoer et al. ........................ 30/34.1
4,505,036 3/1985 Ochiai et al. ........................ 30/34.1

FOREIGN PATENT DOCUMENTS

3111871A1 3/1981 Germany .
3729257A1 9/1987 Germany .
2118886 11/1983 United Kingdom .

*Primary Examiner*—Douglas D. Watts
*Attorney, Agent, or Firm*—Fish & Richardson

[57] ABSTRACT

The invention relates to an electric shaver with at least one short-hair cutting system fitted on a housing and at least one sliding actuating switch fitted on the housing to set a long-hair cutting system from an "off" position to at least one operative position. The actuating switch is operatively connected to at least one of the cutting systems via a coupling gear reducing the switching path.

13 Claims, 3 Drawing Sheets

ELECTRIC SHAVING APPARATUS

This invention relates to an electric shaving apparatus having at least one short-hair cutter assembly arranged on a housing and at least one control switch slidably mounted on the housing for setting a long-hair trimmer assembly from an "Off" position to at least one operating position, with at least one switching member being operatively associated with at least one of the cutter assemblies through a transmission means.

An electric shaver with short-hair cutter assemblies arranged on a housing and a control switch slidably mounted on the housing for adjusting a long-hair trimmer assembly is already known U.S. Pat. No. 4,941,259. For adjusting the long-hair trimmer assembly, the shaver includes a control switch with a transmission ratio, so that in this configuration of the control switch relatively long lengths of actuator travel must be covered to adjust the long-hair trimmer assembly.

In another known shaver (DE 31 11 871 A1), the coupling function between a slide means and a long-hair trimmer assembly is performed by a transmission means in order that the long-hair trimmer assembly travel double the length the slide means travels when actuated. As a transmission means, a fairly complicated, trouble-prone thrust tie-rod device is provided.

Accordingly, it is an object of the present invention to configure the control switch and the transmission elements between the control switch and the long-hair trimmer assembly by simple constructional means such as to enable the length of contact travel of the control switch required for adjusting the long-hair trimmer assembly to be reduced.

According to the present invention, this object is accomplished in that at least the control switch is operatively associated with at least one of the cutter assemblies by means of a multi-linkage mechanism reducing the length of contact travel. As a result, the transmission means provides in a simple and economical manner a driving connection between the control switch and the cutter assembly which affords great ease of motion, produces large transmission ratios, and reduces the normally very long length of contact travel of the control switch significantly.

A further essential advantage of the present invention resides in that the control switch for the long-hair trimmer covers constant lengths of contact travel, while the associated slide means of the long-hair trimmer assembly may cover different lengths of contact travel suited to the individual application. This results in a substantial improvement of the operating comfort and the manipulation of the shaver for its user.

Further, the use of a coupler mechanism reduces the actuating and friction forces to a minimum. To this end, it is advantageous to configure the transmission means as a coupler mechanism. By installing a coupler mechanism, a minimum of space is required in the shaver housing to accommodate therein a transmission means with a high transmission ratio. Still further, the coupler mechanism may be readily configured such as to describe with its coupler point a coupler curve composed of a straight-line segment and a curved segment. A curved motion of at least one transmission member is thereby readily convertible into a straight-line motion without necessitating a larger space for accommodating the transmission means. The coupler mechanism further enables variable transmission ratios to be accomplished which are adapted to the individual application.

In a further feature of the device of the present invention, an additional possibility is afforded in that the coupler mechanism includes a pin arranged in the area of its coupler point, the pin extending on a straight-line segment over one area, while extending on the curved segment of the coupler curve over another area.

Still further, the coupler mechanism advantageously includes a rocking member having its one end connected to the coupler by means of a hinge pin, while its other end is connected to a stationary point in the housing, and the coupler mechanism includes a crank having its one end connected to the coupler by means of a hinge pin, while its other end is connected to a stationary point in the housing. Owing to the configuration of the coupler mechanism as a four-bar linkage mechanism and the advantageous arrangement of the crank arm, it is possible to accomplish large transmission ratios between the control switch and the long-hair trimmer.

The use of a coupler mechanism arranged on a crank arm enables relatively large transmission ratios to be accomplished with ease and low friction energy between the control switch and the short-hair cutter assembly, the more so since a minimum of space is required to accommodate a relatively large lever arm configured as a crank by means of which large actuating forces can be transmitted and translated with low friction energy. This transmission means further affords a simple way of converting the circular motion of the crank into a straight-line motion.

In a still further feature of the present invention, it is an advantage that the coupler is connected with a coulisse provided in the slide means by means of an engaging pin, and the crank includes at least one engaging pin received in a coulisse provided in the long-hair trimmer assembly or in a switch plate of the control switch, transmitting the actuating travel of the control switch to the long-hair trimmer assembly. The use of the coulisses provided in the slide means and in the switch plate is especially suitable for converting the straight-line motion of the switch plate into a circular motion of the engaging pin, whereby also the actuating travel of the switch plate can be passed on to the long-hair trimmer assembly, suitably translated by the transmission means.

A preferred embodiment of the solution of the present invention finally provides for the coulisse in the long-hair trimmer assembly to be arranged at an angle, in particular at right angles, to the path of motion of the long-hair trimmer assembly. This affords a simple way of compensating for a lateral movement of the pin when it moves out of the straight-line segment into a curved segment of the coulisse. The angle relative to the path of motion of the long-hair trimmer assembly may vary.

It is of particular importance to the present invention that the engaging pin disposed on the crank is operatively associated with the control switch by direct or indirect means.

It is further advantageous that the control switch is provided with a switch plate which has an angled actuating member in which the coulisse for receiving the engaging pin disposed on the crank is provided.

Further details of the present invention are set out and illustrated in the subclaims, the description and, respectively, the Figures.

An embodiment of the present invention will now be described by way of example without being limited to this particular embodiment, reference being had to the accompanying drawings. In the drawings, FIG. 1 is a front view of a shaving apparatus incorporating a shaving head, a long-hair trimmer assembly, a control switch and an On/Off switch;

Figure 1:
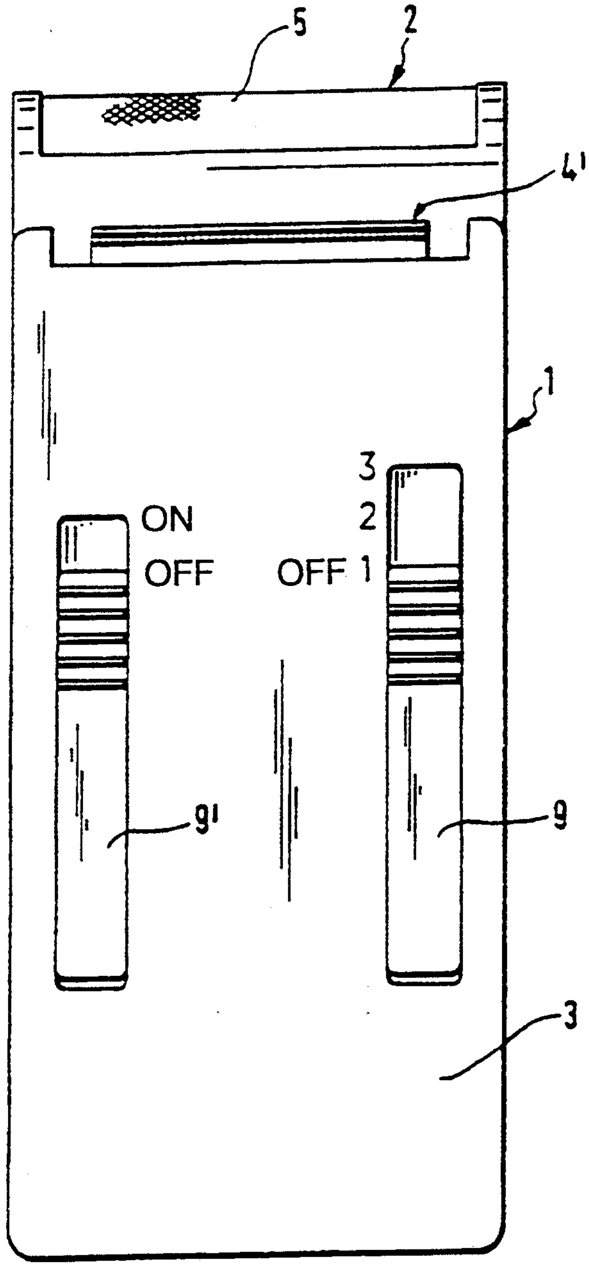

Referring now to FIG. 1 of the drawings, there is shown an electric shaving apparatus having a housing 1 and a short-hair cutter assembly 2 as well as a first control switch 9 slidably arranged on the front panel 3 of the housing 1 and associated with a long-hair trimmer assembly 4.

The long-hair trimmer assembly 4 is comprised of a slide means 15 and a long-hair trimmer 4' slidably mounted therein. The slide means 15 is slidably received on the front panel of the housing 1 behind the housing wall 8.

The long-hair trimmer assembly 4 includes a plate 40 of a T-shaped configuration. The plate 40 of the long-hair trimmer assembly 4 is guided within two relatively spaced guiding members 22. To this end, the long-hair trimmer 4' has on its front side two relatively spaced guide elements 31 provided with a respective guide groove 32 slidably receiving therein a respective guiding member 22. The two guiding members 22 are fixedly mounted on the plate 40 of the long-hair trimmer assembly 4.

In addition, the elongate plate 40 extending in downward direction is vertically movably received in a slotted opening 24 as well as in a rectangular opening 30. The slotted opening 24 and the opening 30 are provided in the slide means 15 slidably mounted on the front panel of the housing 1.

Figure 2:
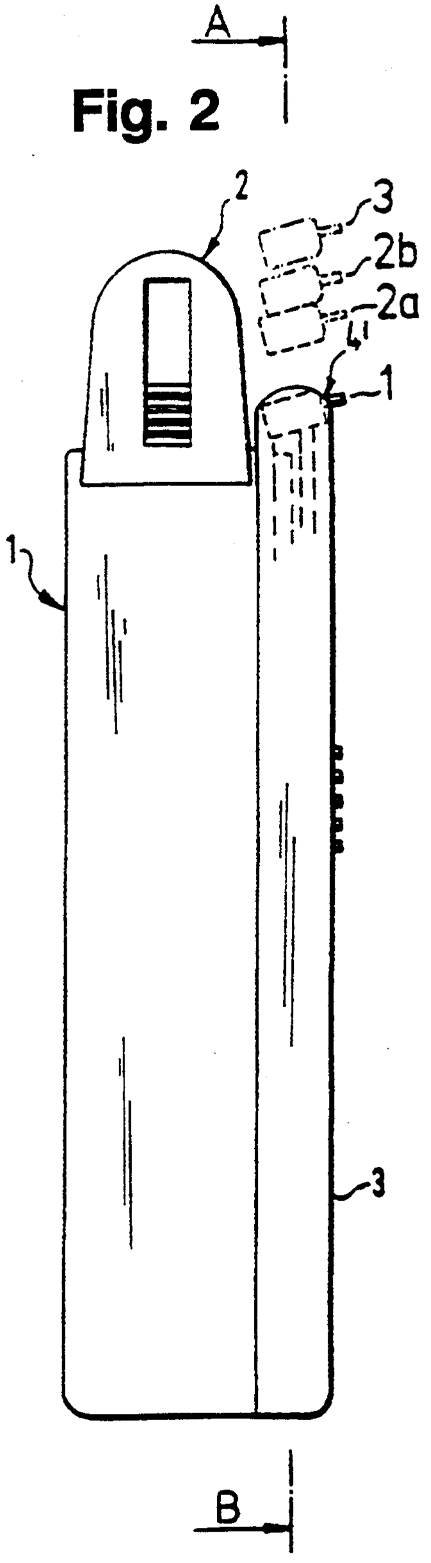
FIG. 2 is a side view of the shaving apparatus of FIG. 1.

Seated between an upper edge 33 of the plate 40 and a lower edge 34 is a respective spring 36 mounted on a respective guide pin 35. The upper end of each guide pin 35 is fixedly connected with the respective right-hand and left-hand guide element 31, while the lower end thereof is slidably received in a respective bore 29 provided in the slide means 15. In the "combination" position (see also FIG. 2), when a downward pressure is exerted upon the long-hair trimmer 4', the long-hair trimmer 4' is able to move or recede downward, thereby conforming itself optimally to the contours of a person's skin because the angle of engagement of the long-hair trimmer 4' adapts continually to the outer contour.

The short-hair cutter assembly or the shaving head 2 shown in the drawings as being not adapted to swivel may be swivel-mounted relative to the housing 1 and is equipped with an outer cutter 5 and an inner cutter, not shown in the drawings, which is associated with the outer cutter 5. The shaving head 2 is adapted to be in seating engagement with the top of the housing 1. The inner cutter 5 is driven directly or indirectly by an electric motor not shown in the drawings.

The cutting blade of the long-hair trimmer 4' comprised of a cutting comb and an associated cutting blade driven to perform oscillating movements is equally driven by the electric motor, not shown in the drawings, and by an oscillating bridge member of which the drive member 39 including a slot 41 is shown in the drawings. An oscillating lever 37 pivotally mounted on the plate 40 and having its one end coupled to the cutting blade of the long-hair trimmer 4' through an engaging means 38, while its other end is coupled to the drive member 39 through a pin 128 engaging within the slot 41, transmits the oscillating movement of the oscillating bridge member to the cutting blade.

The control switch 9 by means of which the long-hair trimmer assembly 4 is adjustable to any one of the three settings "1" to "3" is slidably disposed on the housing wall 8 of the shaving apparatus.

Setting "1" corresponds to a position of rest or "Off" position, and setting "2" to a "combination" position in which the long-hair trimmer 4' is floating and capable of receding downward on the application of pressure on the long-hair trimmer 4'.

Setting "3" corresponds to a "trimming" position in which the long-hair trimmer assembly 4 is locked in position, as will be further explained in the following.

A further control switch 9' merely serves the function of moving the short-hair cutter assembly 2 of the shaving apparatus from an "Off" position (Off) into an operating position (On).

Figure 3:
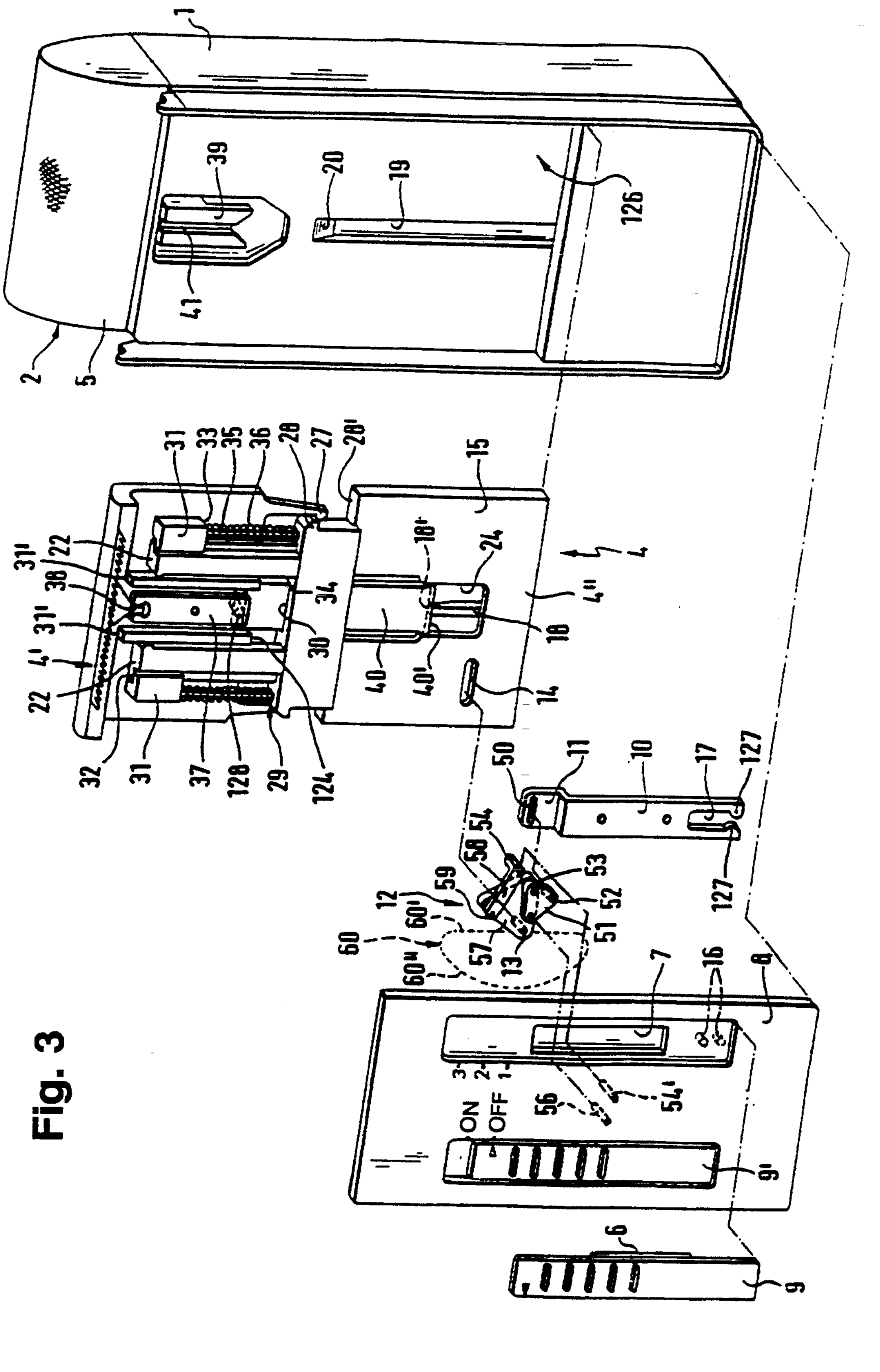
FIG. 3 is an exploded view of the shaving apparatus incorporating a long-hair trimmer adjustable between various positions by means of a crank mechanism.

As becomes further apparent from FIG. 3, the control switch 9 has on its rear side a guide element 6 adjustable within a slotted opening 7 provided in the housing wall 8 to any one of the settings "1, 2, 3".

By means of the guide element 6 and connecting pins, the control switch 9 is connected with a switch plate 10 having at its upper end an angled actuating member 11 with a coulisse 50 for receiving an engaging pin 52. The engaging pin 52 is part of a crank 51 or a coupler mechanism 12.

The coupler mechanism 12 is comprised of a coupler 57 to which a rocking member 58 and a crank 51 are joined with a hinge pin 59 and 53, respectively.

The rocking member 58 is pivotally mounted on a pin 54' in a bore 54 in the housing wall 8, while the crank 51 is pivotally connected to the housing wall 8 through a pin 56.

Further provided on the coupler 57 is another pin 13 engaging in a coulisse 14 of the long-hair trimmer assembly 4 provided in the slide means 15. The coulisse 14 extends approximately normal to the path of motion of the long-hair trimmer assembly 4, enabling a coupler curve 60 described by the pin 13 to be utilized also in the curved area.

As becomes apparent from FIG. 3, the coupler curve 60 includes a straight-line segment 60' and a curved segment 60". When the control switch 9 is displaced from its lowermost position, it is possible that the pin 13 is still in the curved segment 60". The transverse motion of the pin 13 can be compensated for by the transversely extending coulisse 14 when the crank 51, driven to perform circular movements, urges the pin 13 out of the curved segment 60" of the coupler curve 60.

The sloping curved segment 60" of the coupler curve 60 is curved in a manner causing the long-hair trimmer 4', as it moves up and down (floating position), to be continuously turned into the one or the other direction within an angular range of about 10°.

When it is desired to actuate the electric drive of the shaving apparatus and thus the cutters provided in the short-hair cutter assembly 2, the control switch 9' is moved to the "On" position. On displacement of the control switch 9 to setting "2", the long-hair trimmer assembly 4 coupled to the control switch 9 will also be activated.

When the control switch 9 is pushed upward to setting "2" by 5 mm, the coupler mechanism 12 will translate the length of travel of about 5 mm to 13 mm, causing the coupler point with its pin 13 to perform a linear travel of a length of about 13 mm. As this occurs, the pin 13 moves on the straight-line segment 60' which may also have a slight curvature, depending on the configuration of the coupler mechanism 12.

When the control switch 9 is moved to setting "3", it will travel a length of about 5 mm, the pin will equally travel a length of 5 mm and may move already into the curved segment 60". The switching characteristic is thereby materially improved because then the lengths of contact travel of the control switch 9 are very short overall. In the last-mentioned displacement of the long-hair trimmer assembly 4 into or out of the "trimming" position, the required lengths of actuator travel are short. However, by suitably arranging and configuring the coupler mechanism, it is possible to design the contact travel of the coupler point or the pin 13 to different lengths without the need to significantly increase the space for the coupler mechanism.

On displacement of the control switch 9 from the "Off" position to the first operating position (setting "2"), the coupler mechanism 12 operates at a transmission ratio of 1:2.5, while a transmission ratio of 1:1 applies when the control switch 9 is displaced from the first operating position into a second operating position (setting "3"). It will be understood that other transmission ratios are also possible, as mentioned in the foregoing.

As becomes further apparent from FIG. 3, the long-hair trimmer 4' is urged upwardly by means of the two springs 36. The upward movement of the long-hair trimmer 4' is limited by two hook members 27 arranged on the side of the plate 40 for engagement with suitable projections 28 provided on the slide means 15.

The hook members 27 provided on the plate 40 include sliding surfaces suitable for abutting engagement with sliding surfaces provided on the slide means 15 as the plate 40 is inserted into the slide means 15, whereby the hook members are bent apart such as to adjust the plate to a holding position.

The downward movement of the long-hair trimmer 4' is limited by abutting engagement of the lower edge 124 of the plate 40 against the edge 34 provided on the slide means 15. Between the lower edge 124 of the plate 40 and the edge 34, a distance of up to 10 mm is provided, which is the range in which the long-hair trimmer 4' is allowed to move up and down when in the floating position.

At the settings "1", "2" and "3", the control switch 9 is adapted to be locked in place by means of locking pins 16 engaged by a bifurcated portion 17 of the switch plate 10 on which knobs 127 are provided.

At the setting "3" which corresponds to the "trimming" position, a detent means 18 locks the movement of the long-hair trimmer 4' or the plate 40 relative to the lower portion 4" of the slide means 15. To this effect, the detent means 18 rests with its upper edge 18' against a lower edge 40' of the plate 40. The detent means 18 is secured to the basic slide structure or the lower portion 4" of the slide means 15 and is of a resilient configuration (see FIG. 4). When the control switch 9 moves the long-hair trimmer assembly 4 into the "trimming" position, the detent means 18 will travel along a slope 20 provided in the slot 19, causing the detent means 18 to move into the locked position of FIG. 3 in which it rests against the lower edge 40' of the plate 40, thereby preventing a downward movement of the long-hair trimmer 4'. The slot 19 is provided in a housing wall 126 of the housing 1. Unlocking of the detent means occurs in the reverse sequence.

Figure 4:
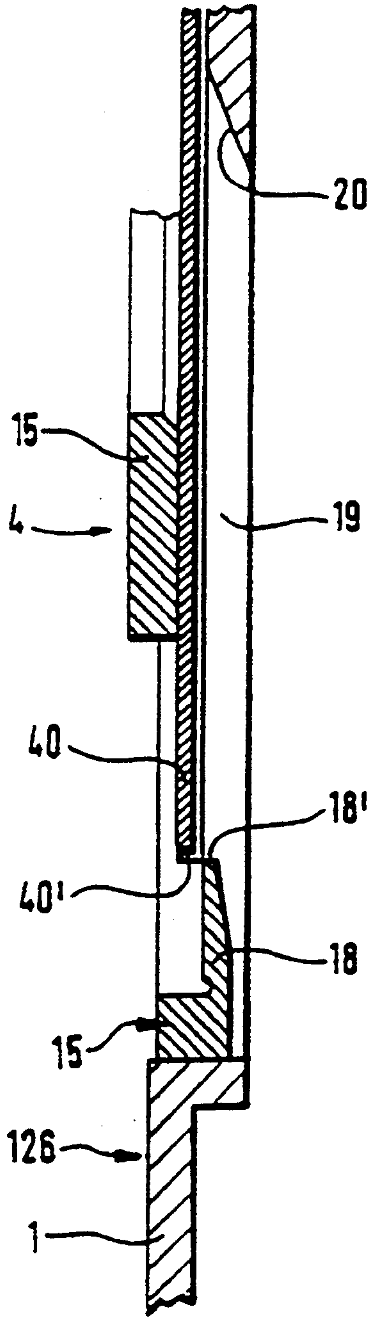
FIG. 4 is a sectional view taken along the line A-B of FIG. 2.

According to FIG. 4, the detent means 18 is in an unlocked position in which the upper edge 18' is moved away from the edge 40' of the plate 40 by virtue of its resilience.

I claim:

1. An electric shaving apparatus comprising housing structure, long hair trimmer structure arranged on said housing structure, at least one short-hair cutter assembly arranged on said housing structure, control switch structure slidably mounted on said housing structure for moving said long-hair trimmer structure between an "Off" position and at least two operating positions, transmission structure in said housing structure, and a switching member for actuating said short-hair cutter assembly, said transmission structure including a coupler member, a coupler pin on said coupler member, said coupler pin being connected to said long-hair trimmer structure and being adapted to move along a straight-line segment of travel for moving said long-hair trimmer structure between an "Off" position and one operating position and to move along a curved segment of travel for moving said long-hair trimmer structure between said one operating position and a second operating position.

2. The shaving apparatus of claim 1 wherein said transmission structure includes a rocking member with one portion of said rocking member connected to said coupler member by means of a hinge pin, and another portion of said rocking member connected to a stationary point in said housing structure.

3. The shaving apparatus of claim 1 wherein said coupler member is connected with a coulisse in said long-hair trimmer structure by means of pin structure.

4. The shaving apparatus of claim 3 wherein said coulisse in said long-hair trimmer structure is arranged at an angle to the path of motion of said long-hair trimmer structure.

5. The shaving apparatus of claim 1 wherein said transmission structure includes a crank member having one portion connected to said coupler member by means of a hinge pin, and a further portion connected to a stationary point in said housing structure.

6. The shaving apparatus of claim 5 wherein said crank member includes at least one engaging pin received in a coulisse in said control switch structure, said engaging pin transmitting the actuating travel of said control switch structure to said long-hair trimmer structure.

7. The shaving apparatus of claim 6 wherein said transmission structure further includes a rocking member with one end of said rocking member connected to said coupler member by means of a hinge pin, and another end of said rocking member connected to a stationary point in said housing structure.

8. The shaving apparatus of claim 6 wherein said coupler member is connected with a coulisse in said long-hair trimmer structure by means of pin structure.

9. The shaving apparatus of claim 6 wherein said engaging pin disposed on said crank member is operatively associated with said control switch structure.

10. The shaving apparatus of claim 6 wherein said control switch structure includes a switch plate which has an actuating portion in which said coulisse for receiving said engaging pin is disposed.

11. The shaving apparatus of claim 10 wherein said coulisse for receiving said engaging pin is arranged at a predetermined angle to the path of motion of said long-hair trimmer structure.

12. The shaving apparatus of claim 11 wherein said transmission structure further includes a rocking member with one portion of said rocking member connected to said coupler member by means of a hinge pin, and another portion of said rocking member connected to a stationary point in said housing structure.

13. The shaving apparatus of claim 12 wherein said coupler member is connected with a coulisse in said long-hair trimmer structure by means of pin structure.

* * * * *